C. KRAUSS.
PROCESS OF MAKING AMMONIA.
APPLICATION FILED MAY 24, 1907. RENEWED MAR. 31, 1909.
922,003.
Patented May 18, 1909.
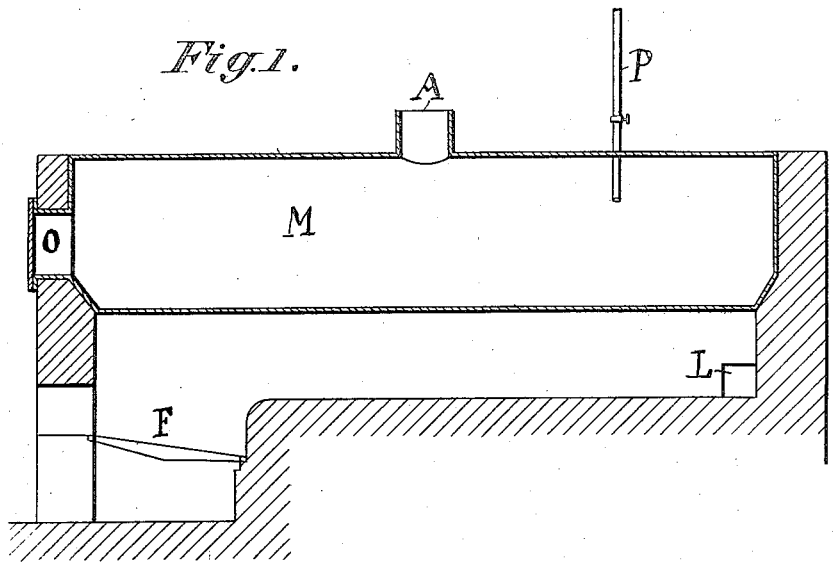
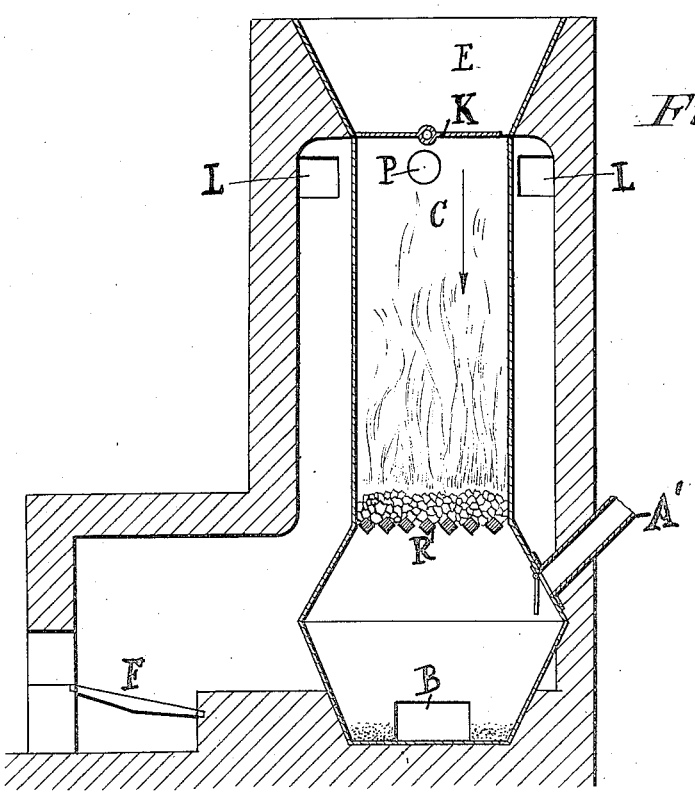
Witnesses:
Inventor.
Constantin Krauss
By H. A. de Vas.
Attorney.

UNITED STATES PATENT OFFICE

CONSTANTIN KRAUSS, OF WESTEREGELN, GERMANY, ASSIGNOR TO GESELLSCHAFT FÜR STICKSTOFFDÜNGER, GESELLSCHAFT MIT BESCHRÄNKTER HAFTUNG, OF WESTEREGELN, GERMANY.

PROCESS OF MAKING AMMONIA.

No. 922,003.  Specification of Letters Patent.  Patented May 18, 1909.

Application filed May 24, 1907, Serial No. 375,396. Renewed March 31, 1909. Serial No. 487,052.

*To all whom it may concern:*

Be it known that I, CONSTANTIN KRAUSS, of Westeregeln, Germany, have invented a certain new and useful Process of Making Ammonia, of which the following is a specification.

It is a well known fact that by the reaction of water on cyanids and cyanamids, as for instance cyanid of potassium, cyanid of calcium, cyanid of sodium, the nitrogen of these compounds may be converted into ammonia. It is furthermore known that the nitrogen of such compounds as are obtained by the reaction of nitrogen upon carbids or carbid-forming mixtures at high temperatures may be converted into ammonia by water and heat. Practice has shown that, when pure water (or steam) is used in the said process, the reaction proceeds but very slowly, whether the nitrogen compounds are made use of in pieces or in the form of a powder, and by using pure water the reaction cannot be carried out quantitatively. For these reasons it is hardly possible to use this reaction directly as a commercial process. I have found by experiment and practical use, that by reacting upon the said nitrogen compounds with water (or steam) and heat in the presence of chlorid of calcium, the whole of the nitrogen of these compounds can be converted into ammonia, and this very easily and in a comparatively short time.

My said invention is fully shown and described in the following specification of which the accompanying drawing forms a part wherein similar letters of reference designate like or equivalent parts wherever found throughout the several views and in which—

Figure 1 is one form of my improved apparatus for carrying my improved process into effect, and Fig. 2 is a like view of a modified form of apparatus for the same purpose.

Referring to the drawing: As shown in Fig. 1, the reference letter M designates a muffle closed on all sides and heated from the fire-place F underneath, said muffle being provided with an opening O for charging and discharging and with an outlet A at the top for the ammonia developed. In said muffle is placed a charge of finely pulverized calcium cyanid intimately mixed with about the double of its weight of a concentrated aqueous solution of chlorid of calcium; the opening O is then hermetically closed and the muffle heated. The temperature of the reaction mass will then quickly rise to over 100 degrees C., and ammonia, gas and vapors will escape from the muffle which are condensed in suitable condensing receptacles not shown. On further heating the temperature will gradually rise, the formation of ammonia remaining nearly constant. After some hours the development of ammonia will decrease, the temperature is then caused to rise quickly to over 250 degrees C. Up to this moment two thirds of the whole nitrogen will have been converted into ammonia. When the temperature has reached 250 degrees C., ammonia will again begin to develop, and the last third of nitrogen contained in the mass will be distilled in the form of ammonia. As soon as the temperature shall have reached 400 degrees, it will be found the whole of the nitrogen has been converted into ammonia. In order to drive out the last of nitrogen, wet steam is allowed to flow into the muffle through a suitable pipe P located at any convenient point. The latter is then opened, the gray residue removed, and the operation repeated. Such an operation will generally take 15 to 20 hours according to the thickness of the layer of material employed. Any pulverizing of the substance may be prevented by reducing the nitrogen compounds to egg-sized pieces, thoroughly saturating these pieces with a concentrated aqueous solution of chlorid of calcium and subjecting them to the above described process.

For carrying out the process continuously, I make use of the apparatus shown in Fig. 2, and the process is then carried out in the following manner: Pieces of calcium cyanamid of the size of from a walnut to an egg, are thoroughly saturated with a solution of concentrated chlorid of calcium. Such impregnated pieces are then put into the cylinder or muffle C, which has at its top a funnel-shaped enlargement or hopper E, provided with a valve-obturator K; at the bottom of the cylinder is a rotating grate R with an obturable ash-pit B for receiving the residue or ashes, while the gaseous products of combustion from the grate F, pass off by way of a flue or flues L. From this ash-pit the ammonia produced is sucked off by means of a fan through the pipe A'. The upright cylinder or muffle C is built into a brickwork chamber, and is heated usually by means of a fire-place G. The vapors of ammonia and water developed are drawn off through the mass in the direction shown by the arrows. The residues freed from nitrogen are caused to fall through the grate into the ash-pit at intervals and are removed therefrom from time to time, and the cylinder is in like manner fed with new material through the hopper E.

Taking cyanamid of calcium as an example of the chemical to be treated, it is probable that the following reaction takes place viz:

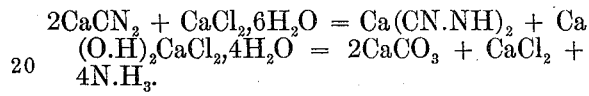

It is evident that the process may also be carried out by forming a mixture of the pulverized nitrogen compounds with pulverized chlorid of calcium, then adding the water required and heating the whole, and that the process may also be carried out by mixing the nitrogen compounds with chlorid of calcium, and causing steam and heat to react upon the mixture, and I do not intend to limit my invention in all its details to the exact manner of carrying the same into effect hereinbefore described, nor to either of the forms of apparatus shown but

Having now fully described my invention, what I claim as new and desire to secure by Letters Patent is:—

1. The process of producing ammonia from suitable cyanogen compounds which consist in subjecting a mixture of the same with chlorid of calcium to the action of water and heat.

2. The process of producing ammonia from cyanamids, which consists in subjecting a mixture of cyanamids with chlorid of calcium to the action of water and heat.

3. The process of producing ammonia from calcium-cyanamid, which consists in subjecting a mixture of calcium cyanamid with chlorid of calcium to the action of water and heat.

4. The process of producing ammonia from suitable cyanogen compounds which consists in subjecting a mixture of the material with chlorid of calcium to the action of steam and heat.

5. The process of producing ammonia from cyanamids, which consists in subjecting a mixture of cyanamids with chlorid of calcium to the action of steam and heat.

6. The process of producing ammonia from calcium-cyanamid which consists in subjecting a mixture of calcium-cyanamid with chlorid of calcium to the action of steam and heat.

7. The process of producing ammonia from suitable cyanogen compounds which consists in mixing the material with an aqueous solution of chlorid of calcium and subjecting the mixture to the action of heat.

8. The process of producing ammonia from cyanamids which consists in mixing the cyanamids with an aqueous solution of chlorid of calcium and subjecting the mixture to the action of heat.

9. The process of producing ammonia from calcium cyanamid, which consists in mixing the calcium cyanamid with an aqueous solution of chlorid of calcium and subjecting the mixture to the action of heat.

10. The process of producing ammonia from suitable cyanogen compounds which consists in reducing the material to suitably sized pieces, saturating the same with a concentrated aqueous solution of chlorid of calcium and subjecting the same to heat.

11. The process of producing ammonia from cyanamid of calcium, which consists in reducing it into egg-sized pieces, saturating the latter with a concentrated aqueous solution of chlorid of calcium and subjecting the same to heat.

12. The process of producing ammonia from suitable cyanogen compounds which consists in adding thereto disintegrated chlorid of calcium and subjecting the mixture to the action of water and heat.

13. The process of producing ammonia from suitable cyanogen compounds which consists in adding thereto disintegrated chlorid of calcium and subjecting the mixture to the action of steam and heat.

In testimony whereof I have hereunto set my hand in presence of two witnesses.

CONSTANTIN KRAUSS.

Witnesses:
HENRY HASPER,
WOLDEMAR HAUPT.